(12) United States Patent
Tillotson et al.

(10) Patent No.: US 10,866,594 B2
(45) Date of Patent: Dec. 15, 2020

(54) FUEL SYSTEMS AND METHODS FOR AN AERIAL VEHICLE

(71) Applicant: The Boeing Company, Chicago, IL (US)

(72) Inventors: Brian Tillotson, Seattle, WA (US); Charles B. Spinelli, Anthem, AZ (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 15/821,776

(22) Filed: Nov. 23, 2017

(65) Prior Publication Data

US 2019/0155311 A1    May 23, 2019

(51) Int. Cl.
| | | |
|---|---|---|
| B64D 39/00 | (2006.01) | |
| G05D 1/10 | (2006.01) | |
| B64C 39/02 | (2006.01) | |
| B64D 5/00 | (2006.01) | |
| B64D 37/12 | (2006.01) | |

(52) U.S. Cl.
CPC ........... *G05D 1/101* (2013.01); *B64C 39/024* (2013.01); *B64D 5/00* (2013.01); *B64D 37/12* (2013.01); *B64C 2201/082* (2013.01); *B64C 2201/104* (2013.01); *B64C 2201/145* (2013.01)

(58) Field of Classification Search
CPC .............................. G05D 1/101; B64C 39/024
See application file for complete search history.

(56) References Cited

U.S. PATENT DOCUMENTS

| | | | |
|---|---|---|---|
| 2,516,150 A | 8/1945 | Samiran | |
| 2,575,534 A | 11/1951 | Stoughton | |
| 2,867,396 A | 1/1959 | Johnson | |
| 2,951,664 A * | 9/1960 | Smith | B64D 37/12 |
| | | | 244/135 R |
| 7,147,188 B2 | 12/2006 | Jakubowski, Jr. et al. | |
| 7,568,660 B2 | 8/2009 | Howe | |
| 7,610,841 B2 | 11/2009 | Padan | |
| 9,021,932 B2 | 5/2015 | Tobias et al. | |

(Continued)

FOREIGN PATENT DOCUMENTS

| | | |
|---|---|---|
| JP | S63 318499 | 12/1988 |
| JP | H05 116689 | 5/1993 |

OTHER PUBLICATIONS

Co-pending U.S. Appl. No. 15/821,778, filed Nov. 23, 2017.
Extended European Search Report prepared by the European Patent Office in application No. 18202786.2 dated Mar. 21, 2019.

*Primary Examiner* — Jess Whittington
(74) *Attorney, Agent, or Firm* — McDonnell Boehnen Hulbert & Berghoff LLP

(57) ABSTRACT

In an example, a drop tank for an aerial vehicle includes a body having an internal fuel reservoir configured to store fuel. The drop tank also includes an outlet coupled to the internal fuel reservoir for supplying the fuel from the internal fuel reservoir to a propulsion system of the aerial vehicle. Additionally, the drop tank includes a plurality of flight control surfaces extending outwardly from the body. The flight control surfaces are actuatable to adjust a flight attitude of the drop tank. The drop tank further includes a flight control system including a processor and configured to actuate the plurality of flight control surfaces to fly the drop tank to a target location when the drop tank is jettisoned from the aerial vehicle.

20 Claims, 7 Drawing Sheets

(56) References Cited

U.S. PATENT DOCUMENTS

| | | | |
|---|---|---|---|
| 2006/0108476 A1* | 5/2006 | Padan | B64D 37/12 244/135 R |
| 2009/0205845 A1* | 8/2009 | Hoffman | A62C 3/025 169/43 |
| 2013/0168499 A1* | 7/2013 | Grossman | B63B 35/50 244/135 A |
| 2014/0263842 A1* | 9/2014 | Salkeld | B64G 1/14 244/159.3 |
| 2015/0217867 A1* | 8/2015 | Eccles | F41G 3/145 244/58 |
| 2015/0370252 A1* | 12/2015 | Hanson | B63B 1/042 701/2 |
| 2016/0107750 A1* | 4/2016 | Yates | B64C 39/024 244/2 |
| 2016/0288918 A1* | 10/2016 | Yates | B64C 39/024 |
| 2017/0300054 A1* | 10/2017 | Hanson | B64C 3/38 |
| 2018/0162502 A1* | 6/2018 | McClure | B63G 8/04 |

\* cited by examiner

US 10,866,594 B2

FUEL SYSTEMS AND METHODS FOR AN AERIAL VEHICLE

FIELD

The present disclosure generally relates to systems and methods for supplying fuel to a vehicle, and more particularly to drop tank systems and methods for supplying fuel to an aerial vehicle.

BACKGROUND

In general, the range and duration of flight for an aerial vehicle is based on an amount of fuel that the aerial vehicle can carry before refueling. One approach to increasing the range and duration of flight for an aerial vehicle is to provide the aerial vehicle with a drop tank. The drop tank is typically an auxiliary fuel tank that is externally coupled to the aerial vehicle. When the fuel in the drop tank is consumed, the aerial vehicle can jettison the drop tank and continue to fly using additionally fuel stored in other fuel tanks of the aerial vehicle. By jettisoning the drop tank, the aerial vehicle can reduce the weight and drag imposed on the aerial vehicle by the drop tank. Jettisoning the drop tank can thus further extend the range of the aerial vehicle.

SUMMARY

In an example, a drop tank for an aerial vehicle includes a body having an internal fuel reservoir configured to store fuel. The drop tank also includes an outlet coupled to the internal fuel reservoir for supplying the fuel from the internal fuel reservoir to a propulsion system of the aerial vehicle. Additionally, the drop tank includes a plurality of flight control surfaces extending outwardly from the body. The flight control surfaces are actuatable to adjust a flight attitude of the drop tank. The drop tank further includes a flight control system including a processor and configured to actuate the plurality of flight control surfaces to fly the drop tank to a target location when the drop tank is jettisoned from the aerial vehicle.

In another example, a method includes supplying fuel from a drop tank to a propulsion system of an aerial vehicle. After supplying the fuel, the method includes determining that the drop tank has been jettisoned from the aerial vehicle. Additionally, the method includes, responsive to determining that the drop tank has been jettisoned, actuating a plurality of flight control surfaces of the drop tank to fly the drop tank to a target location. The method also includes landing the drop tank at the target location.

In another example, a method includes coupling a drop tank to an aerial vehicle. The drop tank includes a body having an internal fuel reservoir, and a plurality of flight control surfaces extending outwardly from the body. The plurality of flight control surfaces are actuatable to adjust a flight attitude of the drop tank. The drop tank also includes a flight control system including a processor and configured to actuate the plurality of flight control surfaces. The method further includes supplying fuel to the internal fuel reservoir of the drop tank, and storing, in the flight control system, data relating to a target location.

The method also includes flying, using at least a portion of the fuel supplied to the internal fuel reservoir, the aerial vehicle to an aerial drop location. The aerial drop location is less than a threshold distance of the target location. The threshold distance is related to a maximum distance of flight for the drop tank. Responsive to flying the aerial vehicle to the aerial drop location, the method includes jettisoning the drop tank from the aerial vehicle. After jettisoning the drop tank from the aerial vehicle, the method includes actuating the plurality of flight control surfaces to fly the drop tank to the target location. Additionally, the method includes landing the drop tank at the target location.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
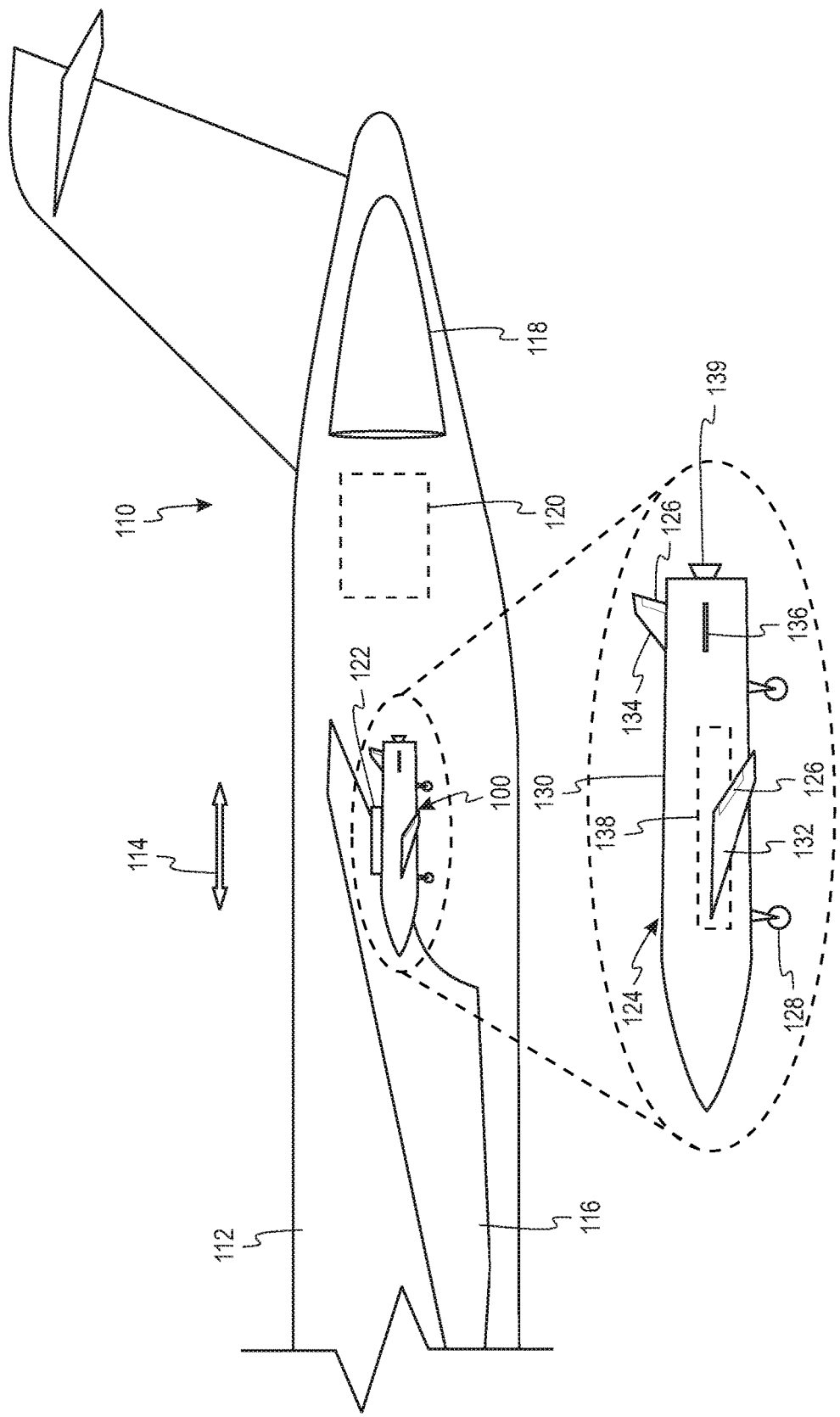
FIG. 1 illustrates a partial side view of a drop tank releasably coupled to an aerial vehicle, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

The systems and methods of the present disclosure provide systems and methods for supplying fuel to an aerial vehicle. As noted above, an aerial vehicle can receive fuel from a drop tank and then jettison the drop tank during flight to extend the range of the aerial vehicle. Typically, once the drop tank is jettisoned, the drop tank falls along an uncontrolled path to the ground. As a result, the drop tank may fall to a random location where it may be lost and/or damaged. An operator may thus have to purchase a new drop tank after every flight, increasing the cost and expense of operating the aircraft.

In another approach, the aerial vehicle flies directly over a designated area and then jettisons the drop tank so that the drop tank is more likely to fall to the ground in the designated area. However, a problem with this approach is that the aerial vehicle typically may need to fly out of the way to position itself directly over the designated area and jettison the drop tank. As such, the aerial vehicle may need to divert from a more optimal flight path to jettison the drop tank, which reduces operational efficiency of the aerial vehicle.

Example systems and methods described herein can beneficially address at least some drawbacks of existing drop tanks. Within the example described herein, a drop tank is releasably coupled to an aerial vehicle. The drop tank includes a body having an internal fuel reservoir for storing fuel and an outlet coupled to the internal fuel reservoir for supplying the fuel from the internal fuel reservoir to a propulsion system of the aerial vehicle. After supplying the fuel to propulsion system during a first portion of a flight, the aerial vehicle can jettison the drop tank and continue to fly during a second portion of the flight (e.g., using additional fuel stored in a fuel tank of the aerial vehicle). Jettisoning the drop tank mid-flight reduces the weight and drag on the aerial vehicle, which increases the fuel efficiency and extends the flight range of the aerial vehicle during the second portion of the flight.

The drop tank includes a plurality of flight control surfaces extending outwardly from the body. The flight control surfaces are actuatable to adjust a flight attitude of the drop tank. The drop tank further includes a flight control system including a processor. The flight control system can actuate the flight control surfaces to fly the drop tank to a target location when the drop tank is jettisoned from the aerial vehicle. The target location can be a designated location for landing the drop tank such as, for example, an airport, a runway, a helipad, a rocket launch pad, and/or an area at which public access is restricted.

By controllably flying the drop tank from the aerial vehicle to the target location, the drop tank can be recovered and re-used for future flights. Additionally, for example, controllably flying the drop tank from the aerial vehicle to the target location can provide greater flexibility in positioning the aerial vehicle when the aerial vehicle jettisons the drop tank. That is, because the drop tank can navigate over a greater range with more precise control, the aerial vehicle can jettison the drop tank at relatively greater distances from the target location than can be achieved by drop tanks lacking flight control surfaces. This also provides for greater flexibility in selecting a location and/or time at which to jettison the drop tank.

Also, within examples, the drop tank can include a landing system. The landing system can reduce (or minimize) damage to the drop tank when the drop tank lands at the target location. By providing the drop tank with the landing system, the re-usability of the drop tank can be increased and the cost of operating the aerial vehicle with the drop tank can be reduced relative to drop tanks that omit the landing system.

Referring now to FIG. 1, a partial perspective view of a drop tank 100 releasably coupled to an aerial vehicle 110 is depicted according to an example embodiment. In FIG. 1, the aerial vehicle 110 is a fixed-wing aircraft. As such, in FIG. 1, the aerial vehicle 110 includes a fuselage 112 that extends in a longitudinal direction 114, and a wing 116 that extends from the fuselage 112 in a transverse direction relative to the longitudinal direction 114. Although the aerial vehicle 110 is depicted as a fixed-wing aircraft in FIG. 1, the aerial vehicle 110 can be a helicopter, a missile, a lighter-than-air vehicle, and/or a spacecraft in other examples. More generally, the aerial vehicle 110 can be any vehicle that can travel by air.

As shown in FIG. 1, the aerial vehicle 110 includes a propulsion system 118 and one or more fuel tanks 120. As examples, the propulsion system 118 can include one or more engines, turbines, propellers, rotors, and/or rockets. The fuel tank(s) 120 can store fuel for powering the propulsion system 118. The type of fuel that is stored in the fuel tank(s) 120 can be based, at least in part, on the type of aerial vehicle 110 to be powered by the fuel. As examples, the fuel can include aviation gasoline, jet propellant, diesel fuel, and/or rocket fuel. More generally, the fuel can be any material that can provide energy for powering the propulsion system 118, and the propulsion system 118 can be any system that can use the fuel to generate thrust for moving the aerial vehicle 110 through the air.

The drop tank 100 is releasably coupled to a station (e.g., a hardpoint) of the aerial vehicle 110 by a releasable coupler 122. The releasable coupler 122 can include a pylon, a launcher, a rack, an ejector rack, and/or a launcher rack for coupling the drop tank 100 to the aerial vehicle 110 during a first phase of flight and jettisoning the drop tank 100 from the aerial vehicle 110 during a second phase of flight. In some implementations, the releasable coupler 122 can passively jettison the drop tank 100 (i.e., by gravity alone). In other implementations, the releasable coupler 122 can actively jettison the drop tank 100, for instance, by applying an ejection force to the drop tank 100 to assist separation of the drop tank 100 from the aerial vehicle 110.

In one example, the releasable coupler 122 can include, at the station of the aerial vehicle 110, a rack for releasably coupling to a plurality of lugs on the drop tank 100. In additional or alternative examples, the releasable coupler 122 can include one or more pyrotechnic charges, pneumatic devices, movable hooks, separation nuts, frangible nuts, separation bolts, bolt cutters, wire cutters, cable cutters, split spool devices (e.g., fusible wires and/or shaped-memory alloy wires), solenoid actuated nuts, marman bands, pin pushers, and/or pin pullers. The type of releasable coupler 122 used to releasably couple the drop tank 100 and the aerial vehicle 110 can be determined based on one or more factors including, for example, susceptibility to electromagnetic interference, release response time, release shock, capability to withstand launch loads, capability to sustain preloads, power input to actuate, weight, size, temperature sensitivity, and/or release reliability.

In some examples, the station is located on an exterior surface of the aerial vehicle 110. For instance, in FIG. 1, the station is on the wing 116 of the aerial vehicle 110. The station can additionally or alternatively be on an exterior surface of the fuselage 112 (e.g., an underside of the fuselage 112). Although FIG. 1 depicts a single drop tank 100 on the wing 116, the aerial vehicle 110 can include one or more drop tanks 100 on the wing 116, another wing on an opposite side of the fuselage 112, and/or the fuselage 112.

In other examples, station can be additionally or alternatively located in the fuselage 112 or the wing 116 of the aerial vehicle 110. For instance, the aerial vehicle 110 can include one or more drop tanks 100 in a cargo bay of the fuselage 112. In such examples, the aerial vehicle 110 can include one or more access doors, which can open during flight of the aerial vehicle 110 to facilitate jettisoning the drop tank 100.

As shown in FIG. 1, the drop tank 100 includes a body 124, a plurality of flight control surfaces 126, and a landing system 128. In FIG. 1, the body 124 is in the form of a fixed-wing aircraft. Specifically, the body 124 includes a fuselage 130 and a pair of wings 132. Additionally, the body 124 includes a vertical stabilizer 134 and a pair of horizontal stabilizers 136 extending from opposing sides of the body 124.

Although the body 124 is in the form of a fixed-wing aircraft in FIG. 1, the body 124 can take other forms in other examples. For instance, in some examples, the body 124 can have an aerodynamic shape, which can facilitate flying the drop tank 100 from the aerial vehicle 110 to the target location. In additional or alternative examples, the body 124 can have a conformal shape relative to a shape of the aerial vehicle 110, and/or the body 124 can have a non-conformal shape relative to the shape of the aerial vehicle 110. Additionally, for example, the body 124 can include one or more canards and/or an empennage in other examples.

The flight control surfaces 126 extend outwardly from the body 124. For example, in FIG. 1, the flight control surfaces 126 extend from the wings 132 and the vertical stabilizer 134 of the drop tank 100. The flight control surfaces 126 are actuatable to adjust a flight attitude of the drop tank 100. As examples, the flight control surfaces 126 can include an elevator, a rudder, an aileron, a flap, a spoiler, a leading edge flap, a leading edge slat, a trim tab, a wing, a horizontal stabilizer, a vertical stabilizer, a rotor (e.g., with a controllable pitch), and/or a parafoil. Also, within examples, the flight control surfaces 126 are actuatable to adjust the pitch, roll, and/or yaw of the drop tank 100 while the drop tank 100 is in flight.

The landing system 128 can reduce (or minimize) damage to the drop tank 100 when the drop tank 100 lands at the target location. Within examples, the landing system 128 can facilitate landing the drop tank 100 on a ground surface, water, snow, and/or an aircraft carrier. In such examples, the landing system 128 can include, for instance, one or more wheels, skis, pontoons, and/or parachutes. In another example, the landing system 128 can include one or more arrestor hooks that can engage with a net and/or a cable at the target location to arrest the drop tank 100. In another example, the landing system 128 can include one or more rotors, which can provide for an autorotation mode of flight to decrease or limit a rate of descent of the drop tank 100 during landing.

By providing the drop tank 100 with the landing system 128, the re-usability of the drop tank 100 can be increased and the cost of operating the aerial vehicle 110 with the drop tank 100 can be reduced relative to drop tanks that omit the landing system 128. Despite these benefits, the drop tank 100 can omit the landing system 128 in other examples.

In FIG. 1, the wings 132, the vertical stabilizer 134, the horizontal stabilizers 136, the flight control surfaces 126, and the landing system 128 extend from the body 124. In some examples, one or more of these components can be configured to (i) retract within the body 124 prior to the aerial vehicle 110 jettisoning the drop tank 100, and then (ii) deploy to extend from the body 124 after the aerial vehicle 110 jettisons the drop tank 100. This may facilitate reducing drag and increasing operational efficiency prior to aerial vehicle 110 jettisoning the drop tank 100.

The body 124 has an internal fuel reservoir 138 that can store additional fuel for powering the propulsion system 118 of the aerial vehicle 110. In one example, the body 124 can include one or more internal surfaces, which define an enclosed space for storing the fuel. The fuel stored in the internal fuel reservoir 138 can be the same type of fuel as the fuel stored in fuel tank(s) 120 of the aerial vehicle 110, or a type of fuel that differs from the fuel stored in the fuel tank(s) 120.

As shown in FIG. 1, the drop tank 100 can also include a propulsion system 139, which is operable to generate thrust for flying the drop tank 100 after the drop tank 100 is jettisoned from the aerial vehicle 110. For instance, in some implementations, the drop tank 100 can be jettisoned with a residual portion of fuel remaining in the internal fuel reservoir 138. The propulsion system 139 can use the residual portion of fuel in the internal fuel reservoir 138 to generate thrust to assist in flying the drop tank 100 to the target location. As examples, the propulsion system 139 can include one or more engines, turbines, propellers, rotors, and/or rockets.

Although FIG. 1 depicts the drop tank 100 having the propulsion system 139, the drop tank 100 can omit the propulsion system 139 in other examples. For instance, in other examples, the drop tank 100 can fly and/or glide to the target location without the assistance of thrust generated by the propulsion system 139. Additionally, within examples, the drop tank 100 can be jettisoned with a residual portion of fuel remaining in the internal fuel reservoir 138 or no fuel remaining in the internal fuel reservoir 138 (i.e., after the internal fuel reservoir 138 supplies all fuel to the propulsion system 118 of the aerial vehicle 110).

Figure 2:
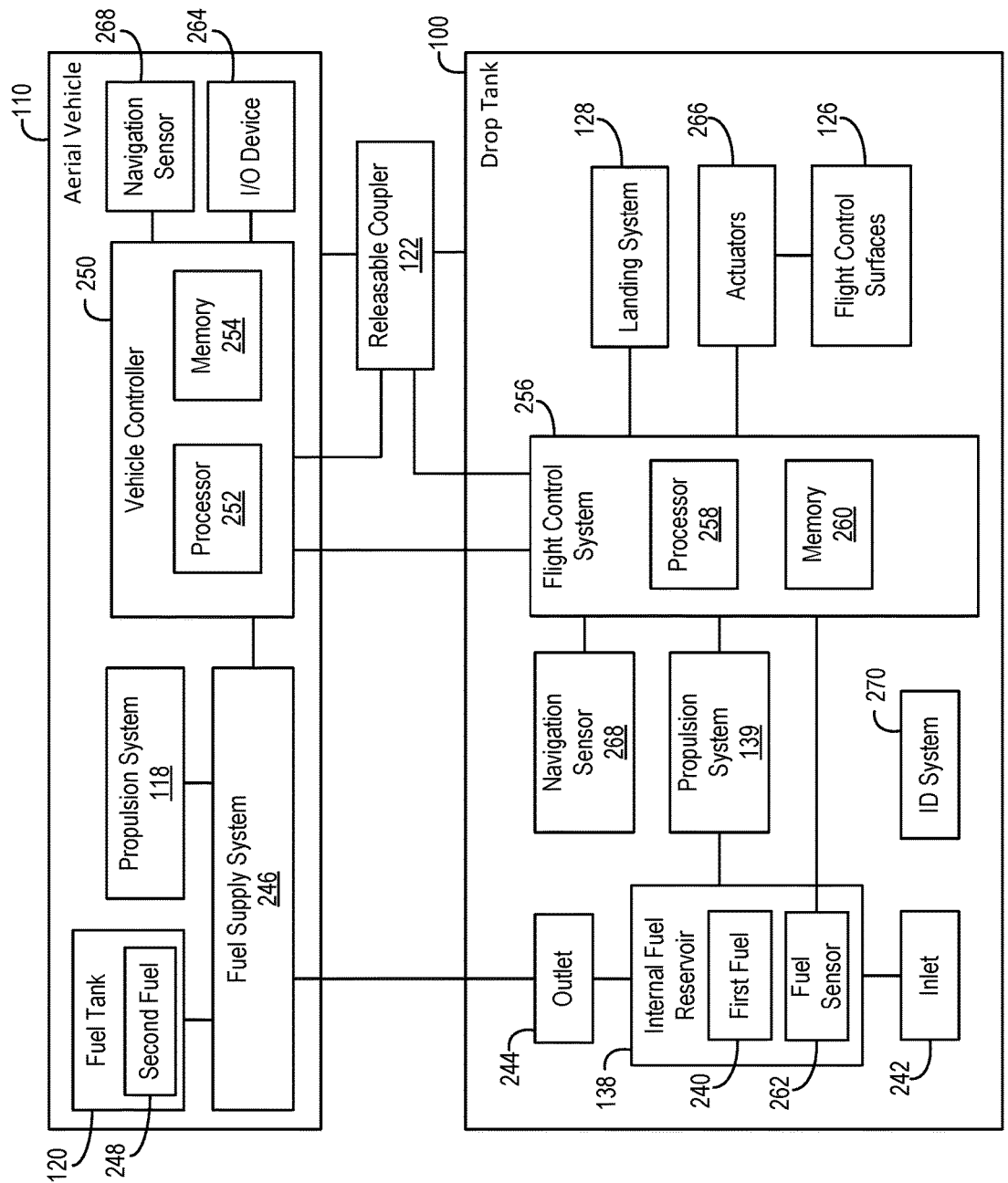
FIG. 2 illustrates a simplified block diagram of the drop tank and the aerial vehicle illustrated in FIG. 1.

FIG. 2 depicts a simplified block diagram including additional components of the drop tank 100 and the aerial vehicle 110 according to an example embodiment. As shown in FIG. 2, the drop tank 100 includes the internal fuel reservoir 138, which stores a first fuel 240 for powering the propulsion system 118 of the aerial vehicle 110. Within examples, the drop tank 100 can be supplied with the first fuel 240 prior to the aerial vehicle 110 departing from a departure location (i.e., prior to take-off). To supply the drop tank 100 with the first fuel 240, the drop tank 100 can include an inlet 242 coupled to the internal fuel reservoir 138. The inlet 242 can thus provide access to the internal fuel reservoir 138 for fueling and/or refueling the drop tank 100 prior to take-off.

The drop tank 100 also includes an outlet 244 coupled to the internal fuel reservoir 138 for supplying the first fuel 240 from the internal fuel reservoir 138 to the propulsion system 118 of the aerial vehicle 110. As shown in FIG. 2, the outlet 244 is coupled to the propulsion system 118 by a fuel supply system 246 of the aerial vehicle 110. The fuel supply system 246 can include one or more valves, fuel pumps, filters, vents, and/or fuel lines for controlling the flow of the first fuel 240 from the internal fuel reservoir 138 to the propulsion system 118. In one example, the outlet 244 can include a valve that can open when the outlet 244 is coupled to the fuel supply system 246 and automatically close when the outlet 244 is decoupled from the propulsion system 118. The outlet 244 can thus facilitate sealing the internal fuel reservoir 138 responsive to the aerial vehicle 110 jettisoning the drop tank 100.

The fuel supply system 246 can also couple the propulsion system 118 to the fuel tank(s) 120 of the aerial vehicle 110. The fuel tank(s) 120 can store a second fuel 248 for powering the propulsion system 118. Within examples, the fuel supply system 246 can further provide for controlling the flow of the second fuel 248 from the fuel tank(s) 120 to the propulsion system 118. As noted above, the first fuel 240 in the internal fuel reservoir 138 and the second fuel 248 in the fuel tank(s) 120 may be the same type of fuel or a different type of fuel.

As shown in FIG. 2, the fuel supply system 246 is in communication with a vehicle controller 250 of the aerial vehicle 110. In general, the vehicle controller 250 is a computing device that is configured to control operation of the fuel supply system 246, and/or provide other functions described further below. For example, the vehicle controller 250 can provide one or more fuel-control signals to the fuel supply system 246 to start, stop, increase, and/or decrease a rate of fuel flow from the internal fuel reservoir 138 and/or the fuel tank(s) 120 to the propulsion system 118. For instance, the vehicle controller 250 can provide the fuel-control signal(s) to actuate the valve(s) and/or fuel pump(s) along the flow path between the internal fuel reservoir 138 and the propulsion system 118 to start, stop, increase, and/or decrease a rate of fuel flow for the first fuel 240. Similarly, for instance, the vehicle controller 250 can provide the fuel-control signal(s) to actuate the valve(s) and/or fuel pump(s) along the flow path between the fuel tank(s) 120 and the propulsion system 118 to start, stop, increase, and/or decrease a rate of fuel flow for the second fuel 248.

The vehicle controller 250 can be implemented using hardware, software, and/or firmware. For example, the vehicle controller 250 can include one or more processors 252 and a non-transitory computer readable medium (e.g., volatile and/or non-volatile memory 254) that stores machine language instructions or other executable instructions. The instructions, when executed by the one or more processors, cause the aerial vehicle 110 to carry out the various operations described herein. The vehicle controller 250, thus, can receive data and store the data in the memory 254 as well.

As described above with respect to FIG. 1, the drop tank 100 is releasably coupled to the aerial vehicle 110 by the releasable coupler 122. Although FIG. 2 depicts the releasable coupler 122 as separate from the aerial vehicle 110 and the drop tank 100, (i) the aerial vehicle 110 can include the releasable coupler 122, (ii) the drop tank 100 can include the releasable coupler 122, or (iii) the aerial vehicle 110 and the drop tank 100 can each include a respective portion of the releasable coupler 122 within examples of the present disclosure. In general, the releasable coupler 122 is actuatable to provide a mechanical release of the drop tank 100 coupled to the aerial vehicle 110 by the releasable coupler 122. For example, the releasable coupler 122 can couple the drop tank 100 to the aerial vehicle 110 in a first state and release the drop tank 100 from the aerial vehicle 110 in a second state.

In some examples, the releasable coupler 122 can be in communication with the vehicle controller 250. In this arrangement, the vehicle controller 250 can selectively actuate the releasable coupler 122 to jettison the drop tank 100. For instance, the vehicle controller 250 can transmit one or more trigger signals to the releasable coupler 122 (e.g., via wired or wireless communication) and, responsive to the trigger signal(s), the releasable coupler 122 can actuate from the first state to the second state to jettison the drop tank 100.

In other examples, the releasable coupler 122 can be additionally or alternatively in communication with a flight control system 256 of the drop tank 100. The flight control system 256 is a computing device that can control operation of the drop tank 100. As described in further detail below, the flight control system 256 can actuate the flight control surfaces 126 to fly the drop tank 100 to the target location when the drop tank 100 jettisoned from the aerial vehicle 110. Additionally, in implementations in which the flight control system 256 is in communication with the releasable coupler 122, the flight control system 256 can transmit the trigger signal(s) to the releasable coupler 122 (via wired and/or wireless communication) and, responsive to the trigger signal(s), the releasable coupler 122 can actuate from the first state to the second state to jettison the drop tank 100 from the aerial vehicle 110.

Similar to the vehicle controller 250, the flight control system 256 can be implemented using hardware, software, and/or firmware. For example, the flight control system 256 can include one or more processors 258 and a non-transitory computer readable medium (e.g., volatile and/or non-volatile memory 260) that stores machine language instructions or other executable instructions. The instructions, when executed by the one or more processors, cause the drop tank 100 to carry out the various operations described herein. The flight control system 256, thus, can receive data and store the data in the memory 260 as well.

As shown in FIG. 2, the flight control system 256 can be additionally or alternatively in communication with the vehicle controller 250. In this arrangement, the flight control system 256 can cause the vehicle controller 250 to actuate the releasable coupler 122, and/or the vehicle controller 250 can cause the flight control system 256 to actuate the releasable coupler 122 in additional or alternative examples. Also, communicatively coupling the flight control system 256 and the vehicle controller 250 can provide for distributed processing to increase the robustness and performance of the operations of the aerial vehicle 110 and/or the drop tank 100 described herein.

Within examples, the vehicle controller 250 and/or the flight control system 256 can determine an aerial drop location at which the aerial vehicle 110 can jettison the drop tank 100 (e.g., by actuating the releasable coupler 122). In some examples, the vehicle controller 250 and/or the flight control system 256 can determine the aerial drop location based on the target location. For instance, the vehicle controller 250 and/or the flight control system 256 can determine the aerial drop location to be a location that is within a threshold distance of the target location, where the threshold distance is related to a maximum distance of flight for the drop tank 100. In this way, the vehicle controller 250 and/or the flight control system 256 can determine the aerial drop location such that the drop tank 100 will be capable of flying to the target location when jettisoned from the aerial vehicle 110 (i.e., the aerial vehicle 110 can jettison the drop tank 100 within a reachable distance of the target location).

The maximum distance of flight for the drop tank 100 can be based on various factors such as, for instance, (i) an altitude of the drop tank 100, (ii) a glide ratio of the drop tank 100, (iii) a distance from the aerial drop location to the target location, (iv) wind conditions (e.g., speed and/or direction) between the aerial drop location and the target location, and/or (v) an amount of the first fuel 240 remaining in the internal fuel reservoir 138. Thus, in some examples, the vehicle controller 250 and/or the flight control system 256 can determine the aerial drop location based on one or more of these factors.

In some examples, the vehicle controller 250 and/or the flight control system 256 can determine the aerial drop location and/or the target location prior to take-off of the aerial vehicle 110. For instance, the vehicle controller 250 and/or the flight control system 256 can store flight plan data relating to, for example, a departure location from which the aerial vehicle 110 will take-off, a destination location at which the aerial vehicle 110 will land, and/or a flight path between the departure location and the destination location. Based on the flight plan data, the vehicle controller 250 and/or the flight control system 256 can determine the aerial drop location and/or the target location.

In other examples, the vehicle controller 250 and/or the flight control system 256 can determine the aerial drop location after take-off of the aerial vehicle 110. For instance, in one implementation, the vehicle controller 250 and/or the flight control system 256 can determine the aerial drop location and/or the target location after a threshold amount of fuel has been supplied from the drop tank 100 to the propulsion system 118 of the aerial vehicle 110. The threshold amount can be all of the first fuel 240 in the internal fuel reservoir 138 (i.e., when the internal fuel reservoir 138 is empty). Alternatively, the threshold amount can relate to a residual portion of fuel for powering the propulsion system 139 of the drop tank 100 to fly the drop tank 100 from the aerial drop location to the target location.

To determine that the threshold amount of fuel has been supplied, the drop tank 100 can include a fuel sensor 262. As shown in FIG. 2, the fuel sensor 262 is operatively coupled to the internal fuel reservoir 138 and in communication with the flight control system 256. The fuel sensor 262 can sense an amount of the first fuel 240 in the internal fuel reservoir 138 and provide to the flight control system 256 a fuel-level signal indicative of the determined amount of the first fuel 240. Responsive to the fuel-level signal, the flight control system 256 can compare the determined amount of first fuel 240 to the threshold amount of fuel to determine when threshold amount of fuel has been supplied from the drop tank 100. As examples, the fuel sensor 262 can include a magnetoresistance fuel level sensor, a capacitive probe, and/or a float-potentiometer level sensor.

After determining that the threshold amount of fuel has been supplied, the vehicle controller 250 and/or the flight control system 256 can select the target location from among a plurality of candidate locations. The plurality of candidate locations can be predetermined locations having facilities, personnel, and/or equipment for landing, recovering, and/or refueling the drop tank 100 (e.g., locations determined prior to take-off on the flight). In an example, the vehicle controller 250 and/or the flight control system 256 select the target location based on at least one of an altitude of the drop tank 100, a glide ratio of the drop tank 100, and/or a distance from the drop tank 100 to the target location. After selecting the target location, the vehicle controller 250 and/or the flight control system 256 can select the aerial drop location based on the selected target location.

In additional or alternative examples, the vehicle controller 250 and/or the flight control system 256 can determine based on user input indicating the target location. For instance, in FIG. 2, the aerial vehicle 110 includes a user input/output device 264 for receiving the user input indicating the target location. As examples, the user input/output device 264 can include a mouse and keyboard, a joystick, a button panel, a touchscreen display, a dedicated display device, an audio speaker, and/or a voice recognition interface.

As shown in FIG. 2, the user input/output device 264 is in communication with the vehicle controller 250. In other examples, the user input/output device 264 can additionally or alternatively be in communication with the flight control system 256. In such examples, the drop tank 100 can include the user input/output device 264 and/or the user input/output device 264 can be separate from both the aerial vehicle 110 and the drop tank 100.

As noted above, when the aerial vehicle 110 jettisons the drop tank 100, the drop tank 100 is operable to fly to the target location. To fly the drop tank 100 to the target location, the flight control system 256 includes the processor and is configured to actuate the flight control surfaces 126. In FIG. 2, for example, the flight control surfaces 126 are coupled to one or more actuators 266, which are in communication with the flight control system 256 (e.g., via a wired and/or wireless communication link). As examples, the actuator(s) 266 can include one or more hydraulic devices, pneumatic devices, and/or electro-mechanic devices for moving the flight control surfaces 126 relative to the body 124. In this arrangement, the flight control system 256 can transmit one or more control signals to the actuator(s) 266 and, responsive to the control signal(s), the actuator(s) 266 can actuate to the flight control surfaces 126 to adjust the flight attitude of the drop tank 100.

As shown in FIG. 2, the flight control system 256 is also in communication with a navigation sensor 268. The navigation sensor 268 can determine a location of the drop tank 100, and provide an indication of the location of the drop tank 100 to the flight control system 256. For instance, the navigation sensor 268 can include a global positioning system (GPS) device, an inertial navigation system (INS), a vision system (e.g., including a camera and image analysis processor), and/or a laser guidance system. In one example, the location determined by the navigation sensor 268 can be defined by a set of coordinates including coordinates for a longitude, a latitude, and/or an altitude of the drop tank 100. In another example, the location determined by the navigation sensor 268 can be defined by a distance and/or a direction of the drop tank 100 relative to one or more reference points (e.g., the target location and/or one or more waypoints). Other examples are also possible.

The flight control system 256 can determine, using the navigation sensor 268, the location of the drop tank 100. The flight control system 256 can determine flight control data based on the determined location of the drop tank 100 and the target location. The flight control system 256 can then actuate, based on the flight control data, the flight control surfaces 126 to fly the drop tank 100 to the target location. By determining flight control data based on a location of the drop tank 100 and using the flight control data to actuate the flight control surfaces 126, the flight control system 256 can controllably and safely fly the drop tank 100 from the aerial vehicle 110 to the target location.

In one implementation, the navigation sensor 268 can be a GPS device in communication with the flight control system 256. The GPS device can determine a set of GPS coordinates of the drop tank 100, and provide the set of GPS coordinates of the drop tank 100 to the flight control system 256. The flight control system 256 can then determine the flight control data based on (i) the set of GPS coordinates of the drop tank 100 and (ii) a set of GPS coordinates of the target location. Responsive to determining the flight control data, the flight control system 256 can actuate the plurality of flight control surfaces 126 based on the flight control data to fly the drop tank 100 to the target location.

In some examples, the flight control system 256 can cause the drop tank 100 to directly fly in a direct route (e.g., along a straight line) from the aerial drop location to the target location. In some instances, this can provide the drop tank 100 with the shortest route to the target location, which can allow the drop tank 100 to reach the target location faster and more efficiently than other routes.

In other examples, the flight control system 256 can cause the drop tank 100 to fly a circuitous route from the aerial drop location to the target location. For instance, the flight control system 256 can cause the drop tank 100 to navigate around obstacles (e.g., trees, radio towers, mountains, windmills, and/or buildings) while flying from aerial drop location to the target location. Additionally, for instance, the flight control system 256 can cause the drop tank 100 to fly along a route, which reduces (or minimize) an extent of flying over heavily populated areas and/or avoids flying in restricted airspace. In further instances, when the drop tank 100 is jettisoned, the flight control system 256 can cause the drop tank 100 to fly back to the departure location from which the aerial vehicle 110 took off.

In some examples, the drop tank 100 can include an indicator system 270, which can facilitate making the drop tank 100 detectable to air traffic control and/or other aerial vehicles. For example, the indication system 270 can include a transponder, a retro-reflector, and/or a flashing light to indicate the location of the drop tank to air traffic control and/or other aerial vehicles. The indication system 270 can help to organize and expedite the flow of air traffic and provide information for pilots of other aerial vehicles near the drop tank 100.

In operation, the drop tank 100 can be releasably coupled to an aerial vehicle 110 by a releasable coupler 122, and the first fuel 240 can be supplied to the drop tank 100 to prepare for take-off of the aerial vehicle 110. Within examples, releasably coupling the drop tank 100 to the aerial vehicle 110 can include mechanically coupling the body 124 of the drop tank 100 to a station of the aerial vehicle 110 such that the drop tank 100 remains coupled to the aerial vehicle 110 until the aerial vehicle 110 jettisons the drop tank 100 (including, for example, during take-off and flight). Additionally, releasably coupling the drop tank 100 to the aerial vehicle 110 can include coupling the outlet 244 of drop tank 100 to the fuel supply system 246 of the aerial vehicle 110 so that the drop tank 100 can supply the first fuel 240 to the propulsion system 118 of the aerial vehicle 110.

In one implementation, an external fuel source at a refueling location can include a fuel line having a nozzle for coupling to the inlet 242. The external fuel source can include, for instance, one or more storage tanks above and/or below ground (e.g., a fuel farm at an airport), a hydrant refueling system, and/or a mobile refueling system (e.g., a refueling truck). In this arrangement, during a fueling operation, the fuel line can supply the first fuel 240 from the external fuel source to the internal fuel reservoir 138 of drop tank 100 via the coupling between the nozzle and the inlet 242. In some examples, the drop tank 100 can be releasably coupled to the aerial vehicle 110 prior to supplying the first fuel 240 to the drop tank 100. In other examples, the drop tank 100 can be supplied with first fuel 240 and then the drop tank 100 can be releasably coupled to the aerial vehicle 110.

After the drop tank 100 is coupled to the aerial vehicle 110 and supplied with the first fuel 240, the aerial vehicle 110 can take-off from the departure location to commence a flight. During a first portion of the flight, the drop tank 100 can supply the first fuel 240 to the propulsion system 118 of the aerial vehicle 110. For example, the vehicle controller 250 and/or the flight control system 256 can control the fuel supply system 246 to cause the first fuel 240 to flow, via the outlet 244, from the internal fuel reservoir 138 to the propulsion system 118. The propulsion system 118 can use the first fuel 240 to generate thrust for flying from the departure location to the aerial drop location. As noted above, the aerial drop location can be less than a threshold distance of the target location, and the threshold distance can be related to a maximum distance of flight for the drop tank 100.

As noted above, the vehicle controller 250 and/or the flight control system 256 can determine the target location and/or the aerial drop location prior to take-off and/or after take-off. In either case, the vehicle controller 250 and/or the flight control system 256 can store the target location and/or the aerial drop location. Also, as described above, the vehicle controller 250 and/or the flight control system 256 can determine target location and/or the aerial drop location based on at least one factor from the group consisting of: an altitude of the drop tank 100, a glide ratio of the drop tank 100, a distance from the aerial drop location to the target location, an amount of fuel remaining in the internal fuel reservoir 138, and user input received from the user input/output device 264.

In some examples, the vehicle controller 250 and/or the flight control system 256 can determine when the aerial vehicle 110 and the drop tank 100 are at the aerial drop location. For example, in FIG. 2, the flight control system 256 can compare a location of the drop tank 100 determined by the navigation sensor 268 to the aerial drop location to determine when the drop tank 100 is at the aerial drop location. Although not shown in FIG. 2, the aerial vehicle 110 can include a navigation sensor in communication with the vehicle controller 250, and the vehicle controller 250 can determine when the aerial vehicle 110 and the drop tank 100 are at the aerial drop location based on the location determined by the navigation sensor of the aerial vehicle 110.

Responsive to flying the aerial vehicle 110 to the aerial drop location, the aerial vehicle 110 can jettison the drop tank 100. For example, responsive to the vehicle controller 250 and/or the flight control system 256 determining that the aerial vehicle 110 and/or the drop tank 100 are at the aerial drop location, the vehicle controller 250 and/or the flight control system 256 can actuate the releasable coupler 122 to jettison the drop tank 100 from the aerial vehicle 110. Within examples, jettisoning the drop tank 100 from the aerial vehicle 110 can include actuating the releasable coupler 122 from the first state to the second state, and/or decoupling the outlet 244 of the drop tank 100 from the fuel supply system 246.

Within examples, the flight control system 256 can determine that the drop tank 100 has been jettisoned from the aerial vehicle 110. For instance, the flight control system 256 can determine that the drop tank 100 has been jettisoned based on one or more signals from the navigation sensor 268, the vehicle controller 250, and/or the releasable coupler 122.

Responsive to the flight control system 256 determining that the drop tank 100 has been jettisoned, the flight control system 256 can actuate the flight control surfaces 126 and/or the propulsion system 139 of the drop tank 100 to fly the drop tank 100 to the target location. For instance, as described above, the flight control system 256 can (i) determine, using the navigation sensor 268, a location of the drop tank 100, (ii) determine flight control data based on the determined location of the drop tank 100 and the target location, and (iii) actuate, based on the flight control data, the flight control surfaces 126 and/or the propulsion system 139 to fly the drop tank 100 to the target location. In some examples, the flight control system 256 can iteratively perform these operations while flying the drop tank 100 to the target location. Additionally, within examples, the flight control system 256 can determine the flight control data by determining one or more waypoints between the aerial drop location and the target location, and actuating the flight control surfaces 126 and/or the propulsion system 139 to fly from waypoint to waypoint until the drop tank 100 reaches the target location.

When the drop tank 100 reaches the target location, the drop tank 100 can use the landing system 128 to land the drop tank 100 at the target location. In some examples, the target location can be the departure location such that landing the drop tank 100 at the target location includes landing the drop tank 100 at the departure location. In other examples, the target location can be a location that is within the threshold distance of the aerial drop location (i.e., within a maximum distance of flight for the drop tank 100).

At the target location, the drop tank 100 can be recovered and prepared for another flight. In some examples, after recovering the drop tank 100 at the target location, the drop tank 100 can be refueled and coupled to another aerial vehicle 110 at the target location. The operations described above can then be repeated for another flight with the drop tank 100 coupled to the other aerial vehicle 110.

In other examples, after recovering the drop tank 100 at the target location, the drop tank 100 can be transported from the target location to a refueling location. The drop tank 100 can then be refueled at the refueling location and coupled to another aerial vehicle 110. In one implementation, the drop tank 100 can be transported by another vehicle (e.g., a train, a truck, an airplane, etc.) to the refueling location. In another implementation, the drop tank 100 can transport itself to the refueling location. For instance, after recovering the drop tank 100 at the target location, the drop tank 100 can be refueled, take-off, and fly using the propulsion system 139 and the flight control surfaces 126 from the target location to the refueling location at which the drop tank 100 can be refueled again and coupled to another aerial vehicle 110.

Also, within examples, after the aerial vehicle 110 jettisons the drop tank 100, the aerial vehicle 110 can continue to fly to a destination location using the second fuel 248 stored in the fuel tank(s) 120. Thus, the aerial vehicle 110 can use the first fuel 240 supplied by the drop tank 100 during a first portion of the flight, and the second fuel 248 supplied by the fuel tank(s) 120 during a second portion of the flight. By jettisoning the drop tank 100 during the flight, the weight and drag on the aerial vehicle 110 is reduced, which extends the range and/or duration of flight for aerial vehicle 110.

Figure 3:
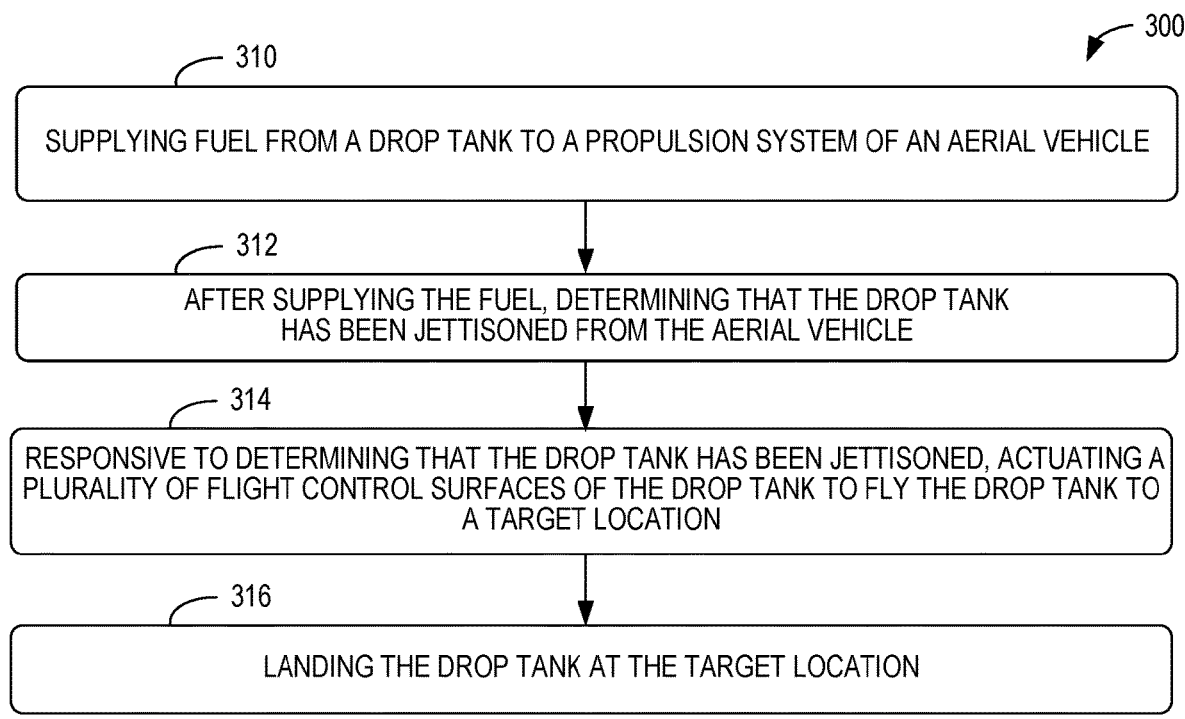
FIG. 3 illustrates a flow chart of an example process for operating a drop tank, according to an example embodiment.

Referring now to FIG. 3, a flowchart for a process 300 for operating a drop tank is illustrated according to an example embodiment. As shown in FIG. 3, at block 310, the process 300 includes supplying fuel from a drop tank to a propulsion system of an aerial vehicle. After supplying the fuel at block 310, the process 300 includes determining that the drop tank has been jettisoned from the aerial vehicle at block 312. Responsive to determining that the drop tank has been jettisoned at block 312, the process 300 includes actuating a plurality of flight control surfaces of the drop tank to fly the drop tank to a target location at block 314. At block 316, the process 300 includes landing the drop tank at the target location.

Figure 4:
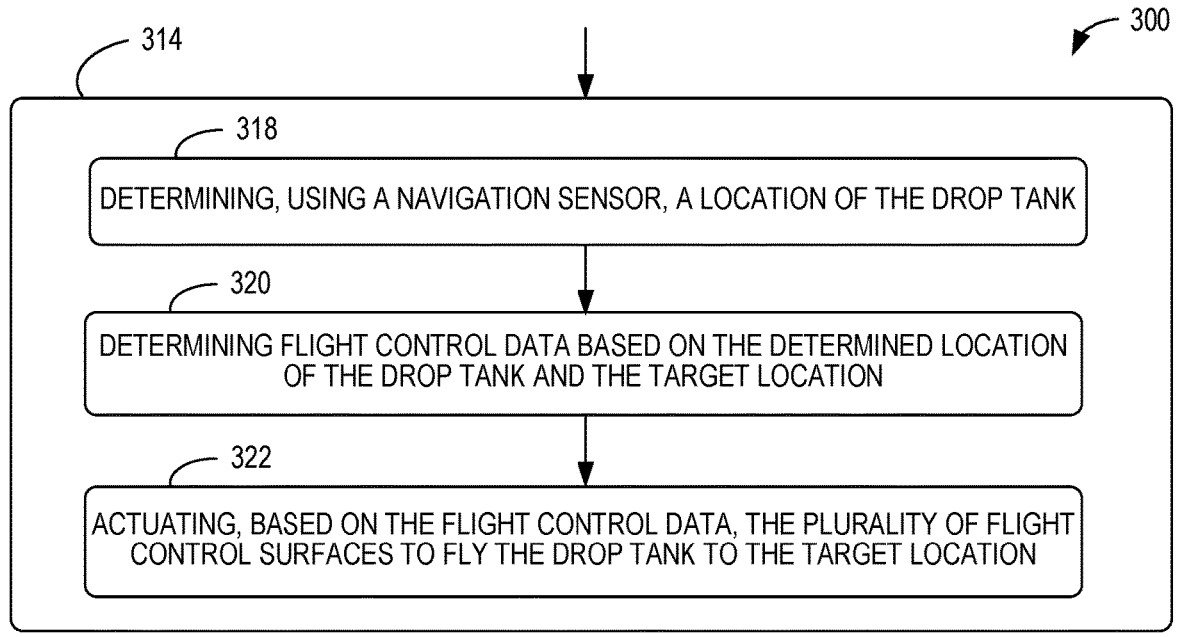
FIG. 4 illustrates a flow chart of an example process for operating a drop tank that can be used with the process shown in FIG. 3.

FIGS. 4-8 depict additional aspects of the process 300 according to further examples. As shown in FIG. 4, actuating the plurality of flight control surfaces of the drop tank to fly the drop tank to the target location at block 314 can include: (i) determining, using a navigation sensor, a location of the drop tank at block 318, (ii) determining flight control data based on the determined location of the drop tank and the target location at block 320, and (iii) and actuating, based on the flight control data, the plurality of flight control surfaces to fly the drop tank to the target location at block 322.

Figure 5:
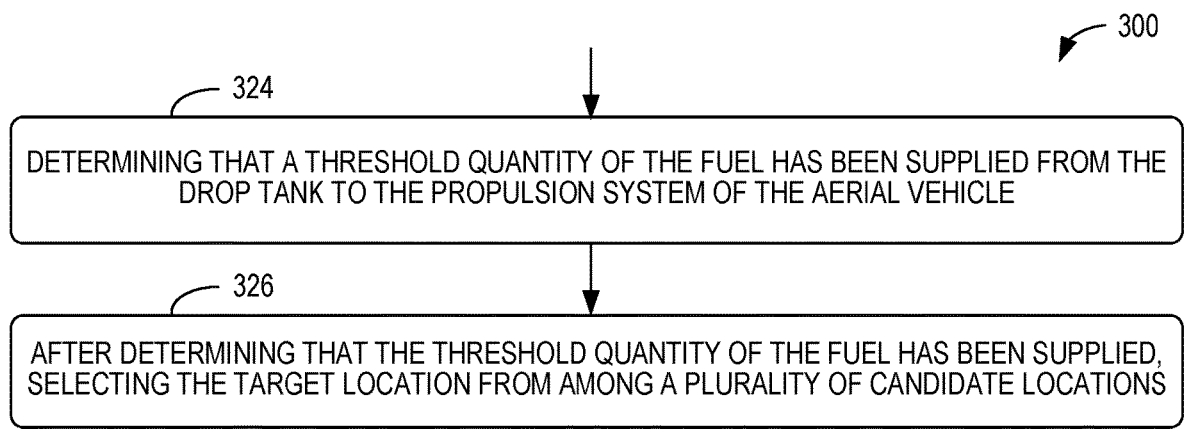
FIG. 5 illustrates a flow chart of an example process for operating a drop tank that can be used with the process shown in FIG. 3.

As shown in FIG. 5, the process 300 can also include determining that a threshold quantity of the fuel has been supplied from the drop tank to the propulsion system of the aerial vehicle at block 324. After determining that the threshold quantity of the fuel has been supplied at block 324, the process 300 can include selecting the target location from among a plurality of candidate locations at block 326.

Figure 6:
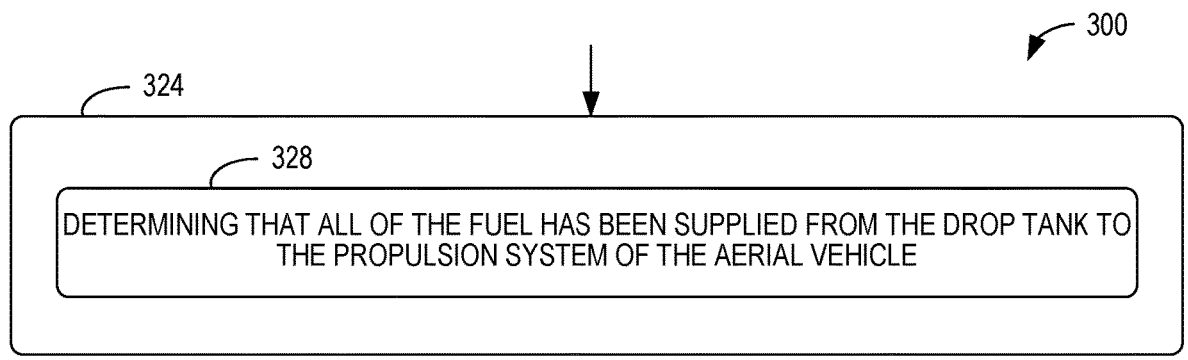
FIG. 6 illustrates a flow chart of an example process for operating a drop tank that can be used with the process shown in FIG. 3.

As shown in FIG. 6, determining the threshold quantity of the fuel has been supplied from the drop tank to the propulsion system of the aerial vehicle at block 324 can include determining that all of the fuel has been supplied from the drop tank to the propulsion system of the aerial vehicle at block 328.

Figure 7:
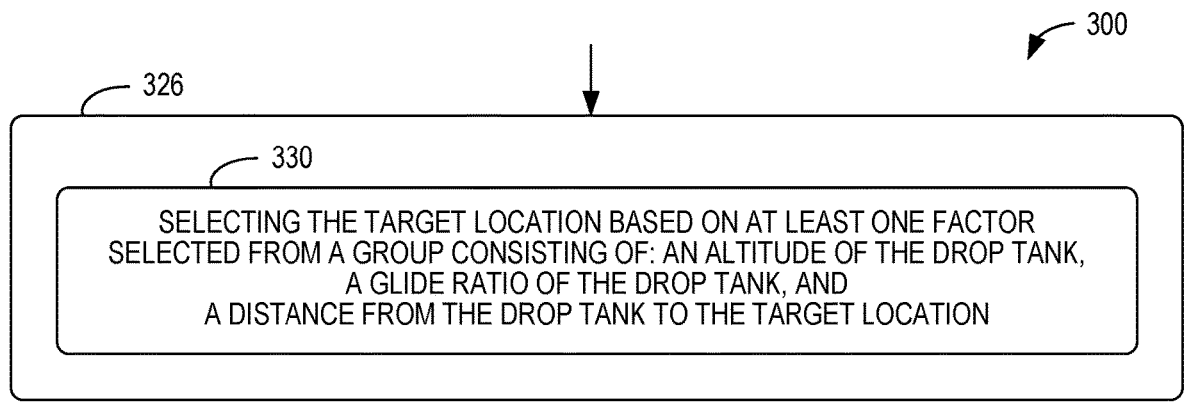
FIG. 7 illustrates a flow chart of an example process for operating a drop tank that can be used with the process shown in FIG. 3.

As shown in FIG. 7, selecting the target location at block 326 can include selecting the target location based on at least one factor selected from a group consisting of: an altitude of the drop tank, a glide ratio of the drop tank, and a distance from the drop tank to the target location at block 330.

Figure 8:
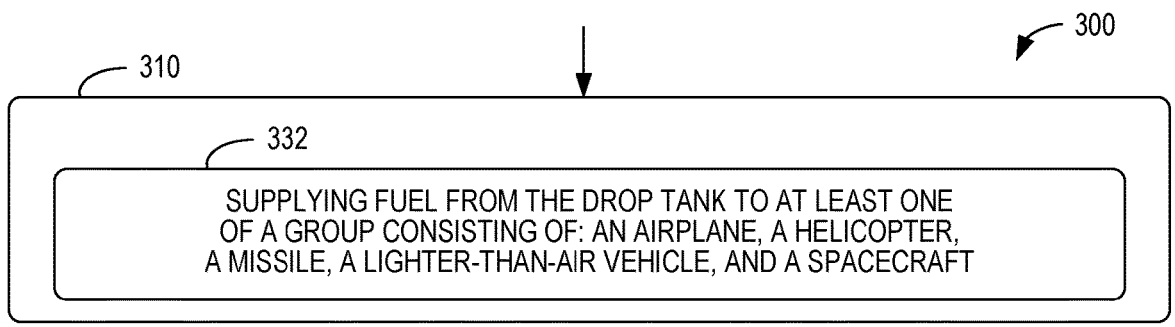
FIG. 8 illustrates a flow chart of an example process for operating a drop tank that can be used with the process shown in FIG. 3.

As shown in FIG. 8, supplying the fuel from the drop tank to the aerial vehicle at block 310 can include supplying fuel from the drop tank to at least one of a group consisting of: an airplane, a helicopter, a missile, a lighter-than-air vehicle, and a spacecraft at block 332.

Figure 9:
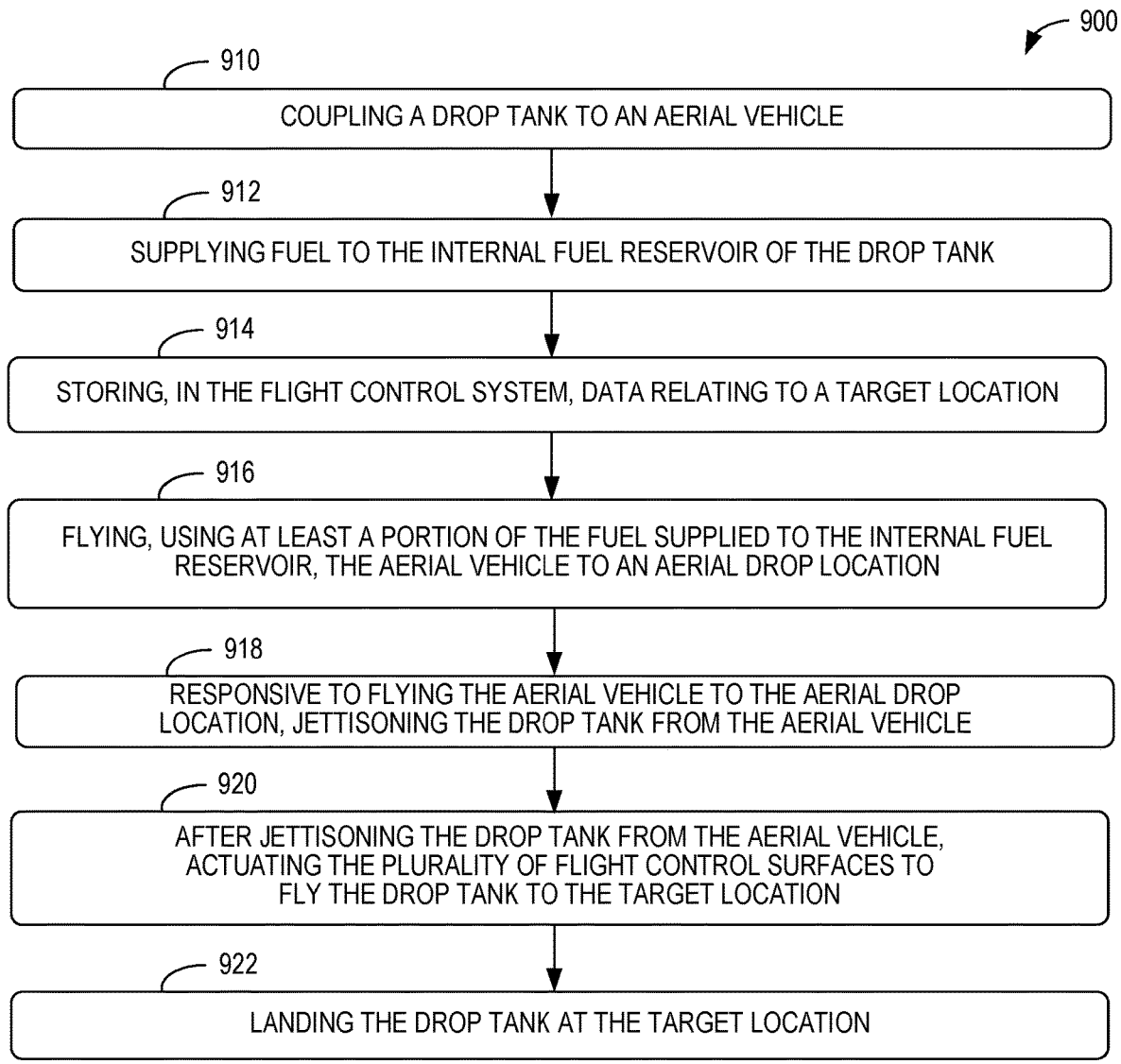
FIG. 9 illustrates a flow chart of an example process according to an example embodiment.

FIG. 9 depicts a flowchart for a process 900 according to another example embodiment. As shown in FIG. 9, the process 900 includes coupling a drop tank to an aerial vehicle at block 910. The drop tank includes a body having an internal fuel reservoir. The drop tank also includes a plurality of flight control surfaces extending outwardly from the body. The plurality of flight control surfaces are actuatable to adjust a flight attitude of the drop tank. The drop tank further includes a flight control system including a processor and configured to actuate the plurality of flight control surfaces.

The process 900 also includes supplying fuel to the internal fuel reservoir of the drop tank at block 912, and storing, in the flight control system, data relating to a target location at block 914. At block 916, the process 900 includes flying, using at least a portion of the fuel supplied to the internal fuel reservoir, the aerial vehicle to an aerial drop location. The aerial drop location is less than a threshold distance of the target location. The threshold distance is related to a maximum distance of flight for the drop tank.

Responsive to flying the aerial vehicle to the aerial drop location at block 916, the process 900 includes jettisoning the drop tank from the aerial vehicle at block 918. After jettisoning the drop tank from the aerial vehicle at block 918, the process 900 includes actuating the plurality of flight control surfaces to fly the drop tank to the target location at block 920. At block 922, the process 900 includes landing the drop tank at the target location.

Figure 10:
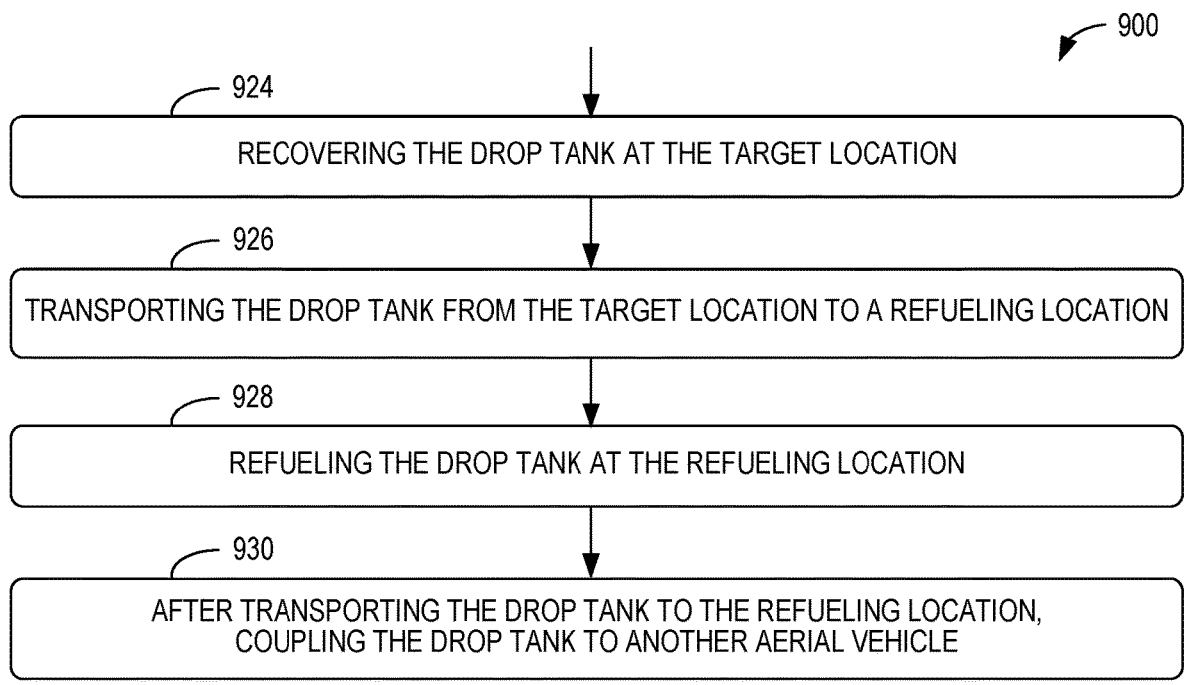
FIG. 10 illustrates a flow chart of an example process that can be used with the process shown in FIG. 9.

FIGS. 10-14 depict additional aspects of the process 900 according to further examples. As shown in FIG. 10, the process 900 further includes recovering the drop tank at the target location at block 924, transporting the drop tank from the target location to a refueling location at block 926, and refueling the drop tank at the refueling location at block 928.

After transporting the drop tank to the refueling location at block 926, the process 900 includes coupling the drop tank to another aerial vehicle at block 930.

Figure 11:
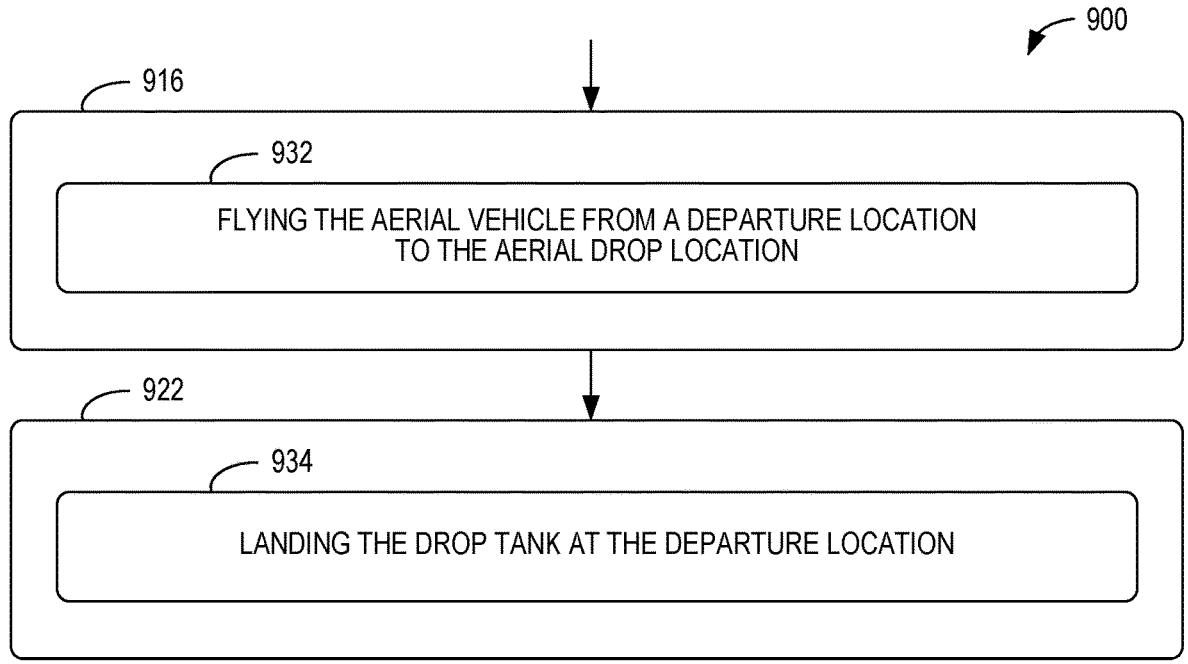
FIG. 11 illustrates a flow chart of an example process that can be used with the process shown in FIG. 9.

As shown in FIG. 11, flying the aerial vehicle to the aerial drop location at block 916 can include flying the aerial vehicle from a departure location to the aerial drop location at block 932. Additionally, landing the drop tank at the target location at block 922 can include landing the drop tank at the departure location at block 934.

Figure 12:
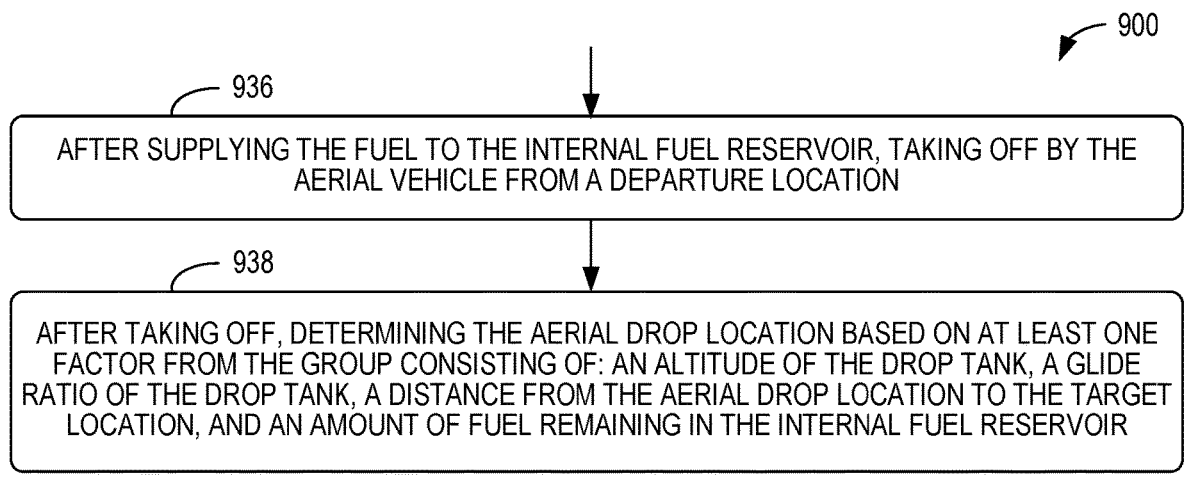
FIG. 12 illustrates a flow chart of an example process that can be used with the process shown in FIG. 9.

As shown in FIG. 12, after supplying the fuel to the internal fuel reservoir at block 912, the process 900 can include taking off by the aerial vehicle from a departure location at block 936. After taking off at block 936, the process 900 can include determining the aerial drop location based on at least one factor from the group consisting of: an altitude of the drop tank, a glide ratio of the drop tank, a distance from the aerial drop location to the target location, and an amount of fuel remaining in the internal fuel reservoir at block 938.

Figure 13:
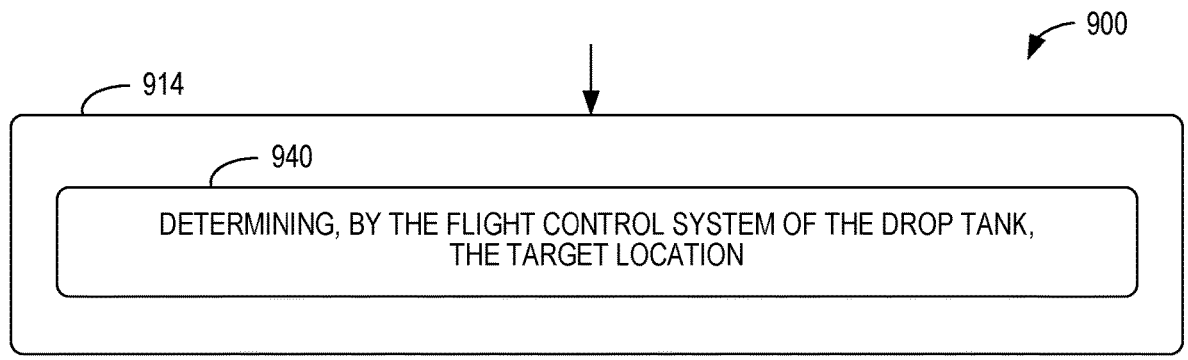
FIG. 13 illustrates a flow chart of an example process that can be used with the process shown in FIG. 9.
Figure 14:
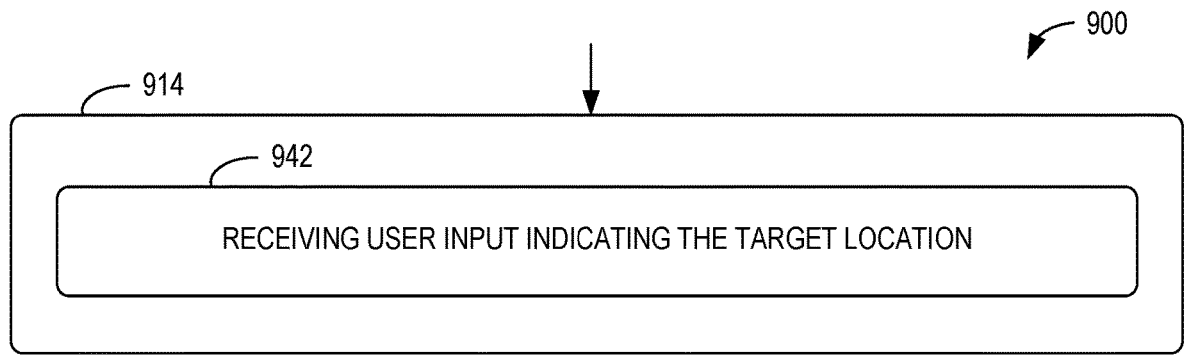
FIG. 14 illustrates a flow chart of an example process that can be used with the process shown in FIG. 9.

As shown in FIG. 13, storing the target location at block 914 can include determining, by the flight control system of the drop tank, the target location at block 940. As shown in FIG. 14, storing the target location at block 914 can include receiving user input indicating the target location at block 942.

Any of the blocks shown in FIGS. 3-14 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A drop tank for an aerial vehicle, comprising:
   a body having an internal fuel reservoir configured to store fuel, wherein the fuel comprises at least one material selected from a group consisting of: an aviation gasoline, a jet propellant, a diesel fuel, and a rocket fuel;
   an outlet coupled to the internal fuel reservoir for supplying the fuel from the internal fuel reservoir to a propulsion system of the aerial vehicle;
   a plurality of flight control surfaces extending outwardly from the body, wherein the flight control surfaces are configured to be actuated to adjust a flight attitude of the drop tank; and
   a flight control system including a processor and configured to actuate the plurality of flight control surfaces to fly the drop tank to a target location when the drop tank is jettisoned from the aerial vehicle,
   wherein the body comprises at least one wing, and
   wherein the at least one wing and the plurality of flight control surfaces are configured to (i) retract within the body prior to the aerial vehicle jettisoning the drop tank and (ii) deploy to extend from the body after the aerial vehicle jettisons the drop tank.

2. The drop tank of claim 1, wherein the plurality of flight control surfaces comprises at least one of a group consisting of: an elevator, a rudder, an aileron, a flap, a spoiler, a leading edge flap, a leading edge slat, and a parafoil.

3. The drop tank of claim 2, wherein the body comprises at least one of a group consisting of: a horizontal stabilizer, and a vertical stabilizer.

4. The drop tank of claim 1, further comprising a landing system for landing the drop tank at the target location,
   wherein the landing system comprises at least one of a group consisting of: a wheel, a ski, a pontoon, a rotor, and a parachute.

5. The drop tank of claim 1, further comprising a global positioning system (GPS) device in communication with the flight control system,
   wherein the GPS device is configured to determine a set of GPS coordinates of the drop tank,
   wherein flight control system is configured to determine flight control data based on (i) the set of GPS coordinates of the drop tank and (ii) a set of GPS coordinates of the target location, and
   wherein the flight control system is configured to actuate the plurality of flight control surfaces based on the flight control data.

6. The drop tank of claim 1, further comprising a propulsion system configured to use a residual portion of the fuel, which remains in the internal fuel reservoir after the aerial vehicle jettisons the drop tank, to provide thrust for flying the drop tank to the target location,
   wherein the flight control system is configured to control the propulsion system.

7. The drop tank of claim 1, wherein the flight control system is configured to determine an aerial drop location, at which the drop tank is to be jettisoned from the aerial vehicle, based on at least one factor selected from a group consisting of: an altitude of the drop tank, a glide ratio of the drop tank, and a distance from the aerial drop location to the target location.

8. The drop tank of claim 7, wherein the flight control system is further configured to determine the aerial drop location based on an amount of fuel remaining in the internal fuel reservoir.

9. The drop tank of claim 1, wherein the flight control system is further configured to:
receive an fuel-level signal from a fuel sensor operatively coupled to the internal fuel reservoir, wherein the fuel-level signal is indicative of an amount of fuel that remains in the internal fuel reservoir,
determine, based on the fuel-level signal, that less than a threshold amount of fuel remains in the internal fuel reservoir, and
responsive to a determination that less than the threshold amount of fuel remains in the internal fuel reservoir, select the target location from among a plurality of candidate locations.

10. A method comprising:
supplying fuel from a drop tank to a propulsion system of an aerial vehicle, wherein the fuel comprises at least one material selected from a group consisting of: an aviation gasoline, a jet propellant, a diesel fuel, and a rocket fuel;
after supplying the fuel, determining that the drop tank has been jettisoned from the aerial vehicle;
deploying at least one wing and a plurality of flight control surfaces from a retracted position in body of the drop tank to an extended position extending from the body of the drop tank;
responsive to determining that the drop tank has been jettisoned, actuating the plurality of flight control surfaces of the drop tank to fly the drop tank to a target location; and
landing the drop tank at the target location.

11. The method of claim 10, wherein actuating the plurality of flight control surfaces of the drop tank to fly the drop tank to the target location comprises:
determining, using a navigation sensor, a location of the drop tank;
determining flight control data based on the determined location of the drop tank and the target location; and
actuating, based on the flight control data, the plurality of flight control surfaces to fly the drop tank to the target location.

12. The method of claim 10, further comprising:
determining that a threshold quantity of the fuel has been supplied from the drop tank to the propulsion system of the aerial vehicle; and
after determining that the threshold quantity of the fuel has been supplied, selecting the target location from among a plurality of candidate locations.

13. The method of claim 12, wherein determining the threshold quantity of the fuel has been supplied from the drop tank to the propulsion system of the aerial vehicle comprises determining that all of the fuel has been supplied from the drop tank to the propulsion system of the aerial vehicle.

14. The method of claim 12, wherein selecting the target location comprises selecting the target location based on at least one factor selected from a group consisting of: an altitude of the drop tank, a glide ratio of the drop tank, and a distance from the drop tank to the target location.

15. The method of claim 10, wherein supplying the fuel from the drop tank to the aerial vehicle comprises supplying fuel from the drop tank to at least one of a group consisting of: an airplane, a helicopter, a missile, a lighter-than-air vehicle, and a spacecraft.

16. A method comprising:
coupling a drop tank to an aerial vehicle, wherein the drop tank comprises:
a body having an internal fuel reservoir,
a plurality of flight control surfaces extending outwardly from the body, wherein the plurality of flight control surfaces are configured to be actuated to adjust a flight attitude of the drop tank, and
a flight control system including a processor and configured to actuate the plurality of flight control surfaces,
wherein the body comprises at least one wing, and
wherein the at least one wing and the plurality of flight control surfaces are configured to (i) retract within the body prior to the aerial vehicle jettisoning the drop tank and (ii) deploy to extend from the body after the aerial vehicle jettisons the drop tank;
supplying fuel to the internal fuel reservoir of the drop tank, wherein the fuel comprises at least one material selected from a group consisting of: an aviation gasoline, a jet propellant, a diesel fuel, and a rocket fuel;
storing, in the flight control system, data relating to a target location;
flying, using at least a portion of the fuel supplied to the internal fuel reservoir, the aerial vehicle to an aerial drop location, wherein the aerial drop location is less than a threshold distance of the target location, wherein the threshold distance is related to a maximum distance of flight for the drop tank;
responsive to flying the aerial vehicle to the aerial drop location, jettisoning the drop tank from the aerial vehicle;
after jettisoning the drop tank from the aerial vehicle, actuating the plurality of flight control surfaces to fly the drop tank to the target location; and
landing the drop tank at the target location.

17. The method of claim 16, further comprising:
recovering the drop tank at the target location;
transporting the drop tank from the target location to a refueling location;
refueling the drop tank at the refueling location; and
after transporting the drop tank to the refueling location, coupling the drop tank to another aerial vehicle.

18. The method of claim 16, wherein flying the aerial vehicle to the aerial drop location comprises flying the aerial vehicle from a departure location to the aerial drop location, and
wherein landing the drop tank at the target location comprises landing the drop tank at the departure location.

19. The method of claim 16, further comprising:
after supplying the fuel to the internal fuel reservoir, taking off by the aerial vehicle from a departure location; and
after taking off, determining the aerial drop location based on at least one factor from the group consisting of: an altitude of the drop tank, a glide ratio of the drop tank, a distance from the aerial drop location to the target location, and an amount of fuel remaining in the internal fuel reservoir.

20. The method of claim 16, wherein storing selecting the target location comprises determining, by the flight control system of the drop tank, the target location.

* * * * *